United States Patent [19]

Ibrahim

[11] Patent Number: 4,774,954

[45] Date of Patent: Oct. 4, 1988

[54] COMPOSITE ORTHOTIC MATERIAL AND METHOD

[76] Inventor: Nabil A. Ibrahim, 6243 N. Post Oak Rd., Peoria, Ill. 61615

[21] Appl. No.: 12,295

[22] Filed: Feb. 9, 1987

[51] Int. Cl.⁴ .............................................. A61F 5/14
[52] U.S. Cl. ..................................... 128/581; 128/627
[58] Field of Search ................. 128/581, 619, 622, 68

[56] References Cited

U.S. PATENT DOCUMENTS

| | | | |
|---|---|---|---|
| 806,353 | 12/1905 | Lipp | 128/622 |
| 1,301,579 | 4/1919 | Lewis | 128/622 |
| 1,459,015 | 6/1923 | Crossman | 128/622 |
| 1,725,767 | 8/1929 | Ruhland | 128/622 |
| 2,295,212 | 9/1942 | Hamel | 128/622 |
| 2,330,398 | 9/1943 | Voss | 128/619 |
| 2,400,680 | 5/1946 | Boos | 128/622 |
| 2,409,594 | 10/1946 | Sherman | 12/146 |
| 2,742,657 | 4/1956 | Sloane | 12/146 |
| 3,320,347 | 5/1967 | Greenawalt | 264/223 |
| 4,285,144 | 8/1981 | Power | 128/581 |
| 4,450,122 | 5/1984 | Gallina | 264/46.4 |
| 4,470,782 | 9/1984 | Zimmerman, Jr. et al. | 425/2 |
| 4,651,445 | 3/1987 | Hannibal | 128/581 |

FOREIGN PATENT DOCUMENTS 2742648  4/1979  Fed. Rep. of Germany ...... 128/581

*Primary Examiner*—William Pieprz
*Assistant Examiner*—Tonya Lamb
*Attorney, Agent, or Firm*—Foley & Lardner, Schwartz, Jeffery, Schwaab, Mack, Blumenthal & Evans

[57] ABSTRACT

A hybrid composite material is constructed from woven reinforced fabrics of Kevlar 49 and biaxially reinforced fibers of graphite and E-Glass bonded together with a thermosetting adhesive, for the application of custom orthotics. The material is designed with the idea of introducing different fibers at different locations of the orthotic in order to take advantage of the unique properties of each reinforcing fibers. The resulting material creates a hybrid composite that exhibits a balance of properties, in both the longitudinal and tranverse directions, unavailable with any single reinforcing fibers. A method of orthotic manufacturing involves a hand lay-up and forming procedure. The constructed composite material is formed and pressed on a prescribed cast, then allowed to cure under pressure. The post-cured material is stripped from the cast, then cut and ground and finally finished to the required orthotic. The produced orthotic combines the desired feature of a thin section with excellent combination of properties relevant to custom orthotics. Such properties include light weight, high strength and modulus, excellent resistance to impact, fatigue, and creep, and outstanding ability to damp vibrations.

19 Claims, 4 Drawing Sheets

Fig. 6
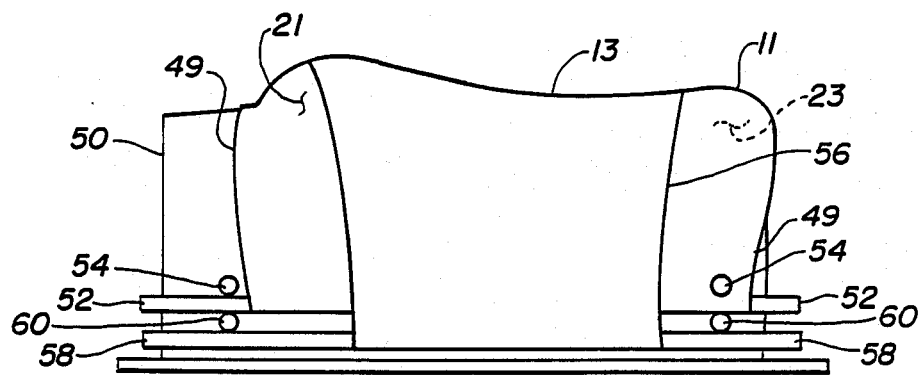
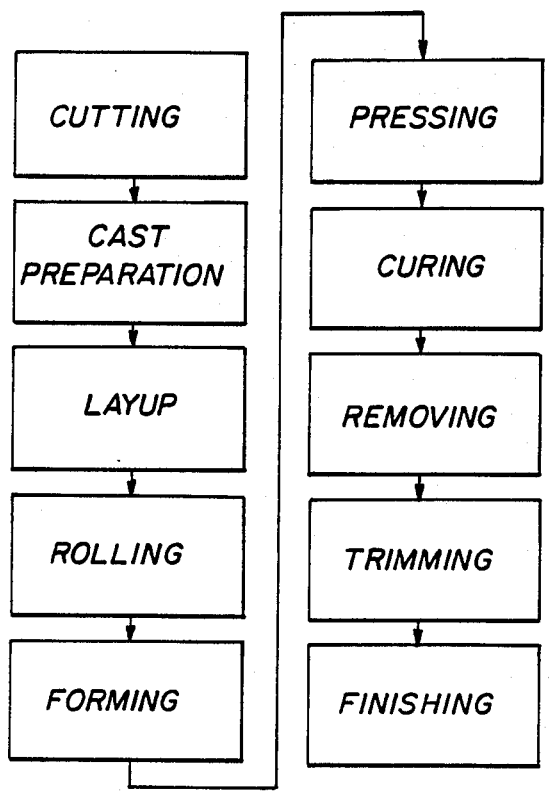
Fig. 7

COMPOSITE ORTHOTIC MATERIAL AND METHOD

BACKGROUND OF THE INVENTION

1. Field of the Invention

This invention relates generally to leg or foot orthopedics and more particularly to a composite orthotic material and a method of manufacture for a custom orthotic device.

2. Background of the Invention

Orthotics, being a branch of mechanical and medical science dealing with bracing or straightening weak or ineffective joints or muscles, involves the custom manufacture of orthotic devices to be worn inside a patient's shoes as a brace or support to help minimize physical discomfort for patients suffering from structural deficiencies in their feet or legs. In the past two decades, two types of light-weight materials have been developed and used in orthotics.

The first type involves a number of thermoplastics that can easily be formed into orthoses by heat. Materials of this type are limited in that they have relatively low tensile and flexural strength. They also have a low modulus of elasticity and poor fatigue resistance. Furthermore, their use is limited to thick sections of orthotic devices because of a stiffness requirement that limits their use in conventional shoes. In addition, they suffer from time-dependent problems such as creep, which renders them ineffective for correcting structural deficiencies. Still further, their strength-to-weight ratio is low.

The second type of material involves a number of advanced composites that have recently been developed to overcome some of the limitations of thermoplastics. Glass and graphite fibers have been introduced into the construction of orthotics in order to provide effective reinforcement. This yielded significant improvement in mechanical properties, including strength-to-weight ratio, flexural strength, modulus, and creep resistance. This also made it possible to use thinner orthotics and to achieve better corrective action than provided by thermoplastics. However, many limitations still exist in that these composites are hard and brittle and have relatively low toughness and impact resistance. Reinforcing fibers used in these composites are usually introduced in one direction, longitudinally, causing the orthotic to be weak in the transverse direction. As a result, orthotic devices made in this way are known to fracture catastrophically and not gradually, and have poor capacity for damping vibrations.

The foregoing illustrates limitations known to exist in present devices. Thus, it is apparent that it would be advantageous to provide an alternative directed to overcoming one or more of the limitations set forth above. Accordingly, a suitable alternative is provided, including features more fully disclosed hereinafter.

SUMMARY OF THE INVENTION

In one aspect of the present invention, this is accomplished by providing a composite orthotic material of layers of woven fabric and biaxially reinfored fabrics. The material has a first and a second side and a longitudingal and transverse axis. One of the layers is on the first side of the material and includes a first type of fiber that extends coaxially with both the longitudinal and transverse axes. Another of the layers is on the second side of the material and includes a second type of fiber extending coaxially with the longitudinal axis and a third type of fiber extending coaxially with the transverse axis.

The foregoing and other aspects will become apparent from the following detailed description of the invention when considered in conjunction with the accompanying drawing. It is to be expressly understood, however, that the drawing is not intended as a definition of the invention but is for the purpose of illustration only.

BRIEF DESCRIPTION OF THE DRAWING

In the drawing:

FIG. 6 is a side view illustrating an embodiment of a formed orthotic being pressed on the cast by stretch fabric during a curing process; and FIG. 7 is a block diagram representing the steps used in the method of making a custom orthotic in accordance with this invention.

DESCRIPTION OF THE PREFERRED EMBODIMENT

The following design considerations are important in developing composite materials for orthotics:
1. light weight,
2. high flexural strength,
3. high compressive strength at the foot side and high tensile strength at the shoe-sole side,
4. good toughness and impact resistance,
5. thin section,
6. high resistance to creep and fatigue, and
7. simple method for manufacturing.

Figure 1A:
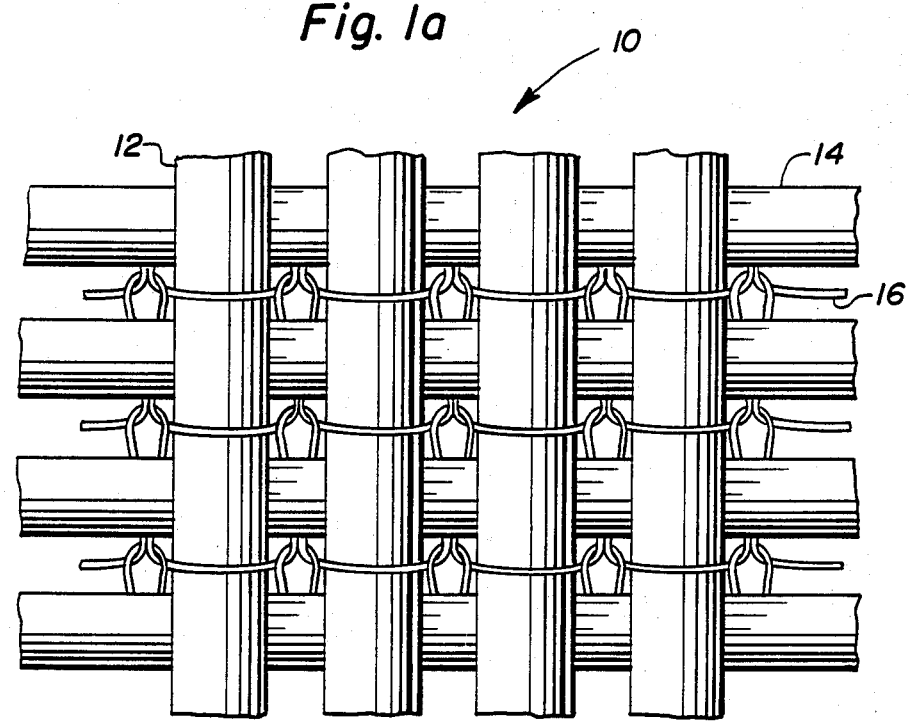
FIG. 1a is an enlarged plan view illustrating an embodiment of a fabric utilizing biaxial reinforcement of longitudinal and transverse fibers in a knitted matrix.
Figure 1B:
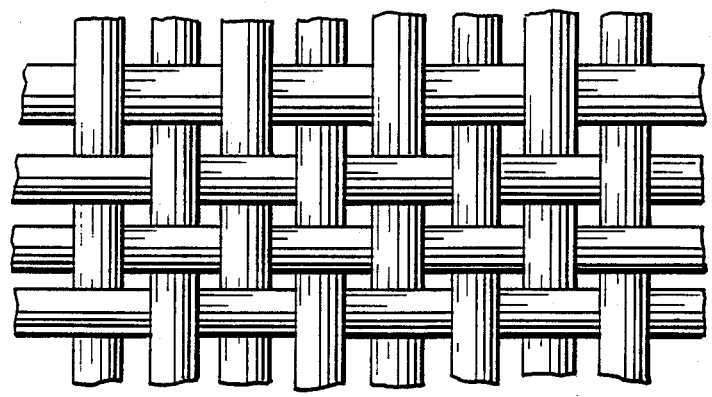
FIG. 1b is an exploded plan view illustrating a portion of woven fabric of longitudinal and transverse fibers.
Figure 2:
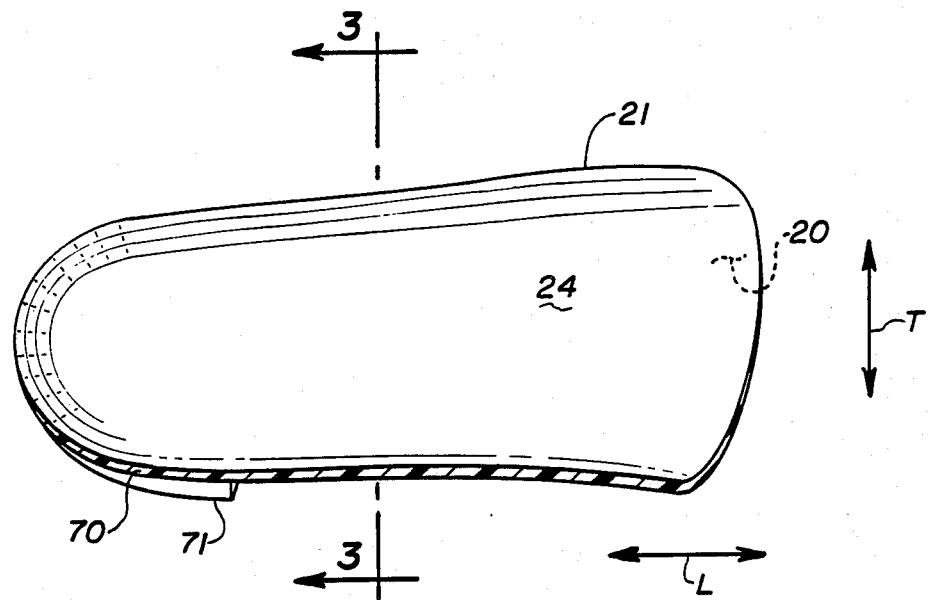
FIG. 2 is a perspective view illustrating an embodiment of a custom orthotic device made in accordance with this invention.
Figure 3:
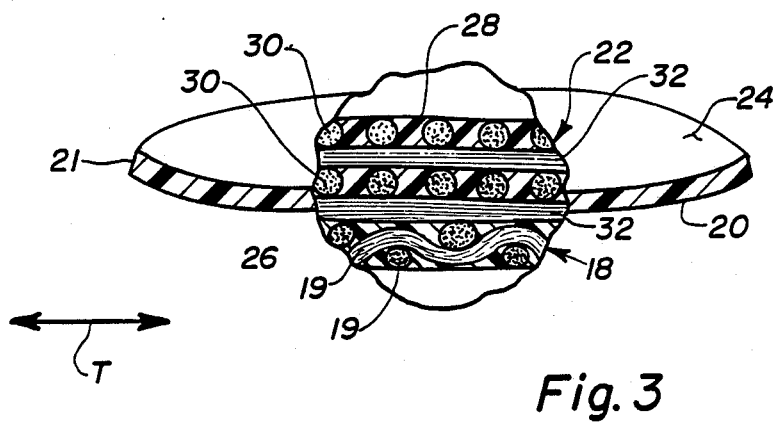
FIG. 3 is an enlarged cross-sectional view taken along line 3—3 of FIG. 2.
Figure 5:
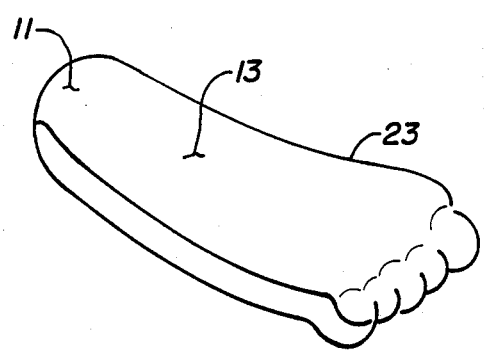
FIG. 5 is a perspective view illustrating a prescribed plaster case of a patient's foot and may be modified to include corrective alterations.

A biaxially knitted fabric generally designated 10, FIG. 1a, is used in the construction of the orthotic material. FIG. 1a illustrates the biaxial reinforcement that includes longitudinally extending fibers 12 and transverse fibers 14 bound together in a knitted matrix by a fiber cord or thread 16. The biaxially knitted fabric is combined with a woven fabric, FIG. 1b, to form a multi-layered composite material that is used to form an orthotic device, 21, FIG. 2, in the general shape of a prescribed foot casting 23, FIG. 5. The layers are bonded together with a thermosetting adhesive 28, FIG. 3. The device 21 is to be used within an associated shoe similar to an insole. The material includes a first layer 18 adjacent a shoe side 20 of the device 21. The first layer 18 is a woven fabric formed of fibers 19 of the product Kevlar 49 manufactured by the DuPont Company. These fibers extend longitudinally, that is in the same direction as the foot extends within the shoe as indicated by the directional arrow designated L, FIG. 2, and transversely, or normal to the longitudinal fibers as indicated by the directional arrow designated T, FIGS. 2 and 3. A second layer 22 is provided adjacent a foot side 24 of the device 21 and a third layer 26 is disposed between the first and second layers, 18, 22, respectively. Each of the second and third layers 22, 26, respectively, include a longitudinally extending graphite or Kevlar fiber 30 and a transversely extending E-Glass fiber 32. The graphite or Kevlar fiber 30 is on the upper or foot side 24 of the second and third layers 22, 26, and the E-Glass fiber 32 is on the shoe side 20 of the second and third layers 22, 26. The woven Kevlar 49 fabric comprising first layer 18 is commercially available from Aircraft Spruce Specialty Co. of Fullerton, Calif. The biaxially reinforced graphite or Kevlar/E-glass fabric comprising second and third layers 22, 26 is commercially available from Composite Reinforcements Business Cofab of Tuscaloosa, Ala.

The three layers 18, 22, 26 are used for the preferred construction of a normal orthotic; however, more layers may be added depending on the stiffness and performance requirements. The conceptual basis for the material construction of this invention is best understood from the following design disclosures:

1. Graphite fibers are introduced longitudinally in the orthotic at the foot side in order to take advantage of their excellent stiffness and compressive strength, 2. Kevlar 49 fibers are introduced biaxially in the orthotic at the shoe-sole side in order to take advantage of their excellent tensile length and to serve as a vibration damping medium, 3. E-Glass fibers are introduced to provide inexpensive reinforcement in the transverse direction and to help the overall mechanical properties of the orthotic, and 4. Additional layers of various fibers may be added at different areas of the orthotic in order to satisfy a special performance requirement.

The following table provides a qualitative comparison of various design considerations for Kevlar 49, graphite and E-Glass fibers.

| Design Consideration | Best | Second Best | Least Best |
| --- | --- | --- | --- |
| Cost | E-Glass | Kevlar 49 | graphite |
| Weight (Density) | Kevlar 49 | graphite | E-Glass |
| Stiffness | graphite | Kevlar 49 | E-Glass |
| Heat Resistance | E-Glass | Kevlar 49 | graphite |
| Toughness, Impact resistance | Kevlar 49 | E-Glass | graphite |
| Specific Tensile strength | Kevlar 49 | graphite | E-Glass |
| Specific Tensile modulus | graphite | Kevlar 49 | E-Glass |
| Strain to failure | E-Glass | Kevlar 49 | graphite |
| Compressive strength | graphite | E-Glass | Kevlar 49 |
| Resistance to vibrations (vibration dampening capacity) | Kevlar | E-Glass | graphite |
| Machinability | graphite | E-Glass | Kevlar 49 |

An important design concept in this invention is the principle of "leak-before-break." This concept ensures that, in the event of accidental overload, the orthotic does not fail catastrophically but gradually. For this reason, the Kevlar layer 18 at the shoe-sole side 20 is selected as a woven fabric that will show significant delamination before orthotic fracture. This delamination process serves as a warning against fracture. It also serves as a warning feature to provide ample time for replacing the orthotic before breakage.

It is important to emphasize that the Kevlar layer 18 is more damage tolerant than the graphite or glass-reinforced layers, 22, 26. Thus, the glass and graphite layers 22, 26 will normally fracture before the Kevlar layer 18. In the event of accidental fracture of the glass or graphite-reinforced layers, the Kevlar-reinforced layer 18 will serve to hold the fractured pieces together, and hence minimize catastrophic failure.

Following are additional features of the material construction of this invention:

1. Biaxial reinforcement provides outstanding properties in both the longitudinal and the transverse directions, 2. Kevlar 49 combined with graphite and E-Glass fibers create a hybrid composite that exhibits a balance of properties unavailable with any single reinforcing fibers.

3. The constructed material has a light weight and high strength and can be produced in thin sections of about 2.0 mm, and 4. The introduction of Kevlar 49, into orthoses containing graphite and glass fibers, provides higher resistance to repeated impact and better ability to dampen vibrations.

The construction of orthotics from biaxially reinforced fabrics of Kevlar 49, graphite, and E-Glass should be performed in a clean environment with low humidity at a temperature of 65°–70° F., and should involve careful handling of fibers.

Figure 4:
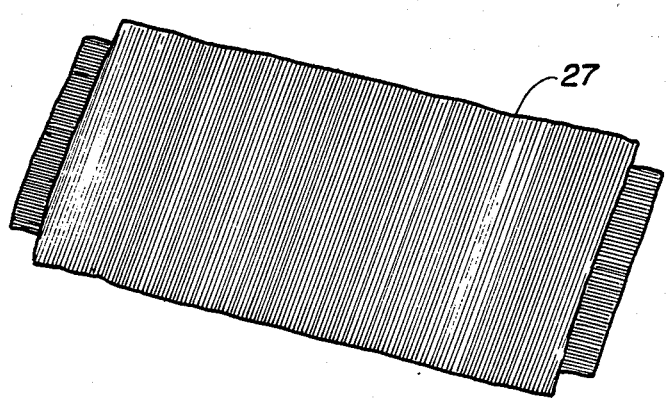
FIG. 4 is a perspective view illustrating a cut sheet of a biaxially knitted fabric having longitudinal and transverse fibers.

The following procedure describes the steps involved in the construction and manufacture of orthotics according to this invention:

1. Fabric Cutting:

Fiber fabrics 27 and release fabrics should be cut with care to the proper size (about 14 cm × 24 cm); see FIG. 4.

2. Cast Preparation:

Prescribed plaster casts should be inspected for cleanliness and should be covered with a non-sticking agent and sprayed with a mold release solution such as the commercially available product No. 10 Partall sold by Cope Plastic, Inc. of Peoria, Illinois.

3. Lay-up:

A freshly prepared and properly mixed adhesive such as the commercially available product Saf-T-Poxy II sold by Aircraft Spruce and Specialty Co. of Fullerton, Calif., should be available for lay-up. A clean table covered with wax paper can be used for the hand lay-up. Place a thin plastic film on the table and place a release fabric on the plastic film. The release fabric is preferably a sheet of Bleeder lease D "Drapable Fiberglass" available from Airtech International Inc. of Carson, Calif. Place a sheet of graphite/E-Glass fabric, layer 22, on the release fabric with the graphite side down. Apply adhesive 28 to the layer 22 thoroughly to ensure penetration into the strands of fibers 30, 32. Place another sheet of graphite/E-Glass fabric, layer 26, on the lay-up and repeat the application of adhesive 28. Place a sheet of Kevlar/Kevlar fabric, layer 18, on the lay-up, and apply adhesive 28. Place a release fabric sheet on layer 18 of the lay-up. The lay-up should be rolled gently with a roller to help adhesive 28 diffuse uniformly between fibers 30, 32, and 19 of layers 18, 26, and 22.

4. Forming and Pressing

Transfer the lay-up from the lay-up table, onto a prepared plaster cast 23, placed on a supporting pressing stand 50, FIG. 6. The lay-up should be positioned on the cast 23 with the graphite fibers 30 (hidden in FIG. 6) facing the cast 23. Care should be taken to avoid disturbing the fibers and ensure that the graphite fibers 30 run longitudinally along the lengthwise direction of the cast 23. A fabric stretcher 49, preferably a sheet of nylon or polyester fabric, is applied by hand and wrapped around a rod 52 that is held in place by hangers or hooks 54 on each side of the press 50. The stretched fabric 49 should be pulled tight over the heel portion 11 of cast 23. Finger pressure should be carefully applied to ensure that the lay-up conforms well to the cast 23, and that there are no surface distortions. A second fabric stretcher 56 should be applied to support the arch area 13 of cast 23 and to ensure uniform pressure to the layered orthotic material. Second fabric stretcher 56 is also wrapped around a rod 58 that is held in place by hangers or hooks 60.

5. Curing:

Following the pressing operation, curing can be achieved in air at room temperature for about 24 hours. Heat can be provided to accelerate the curing process but the temperature should not exceed 110° C. for about 8 hours.

6. Stripping and Trimming:

After orthotics are hardened enough by curing, they can be stripped from the cast. Remove the fabric stretchers 49, 56 from the press 50 and remove the cast 23, together with the orthotic device 21 (hidden in FIG. 6), from the press 50. Strip the orthotic 21 from the cast 23 and trim excess lay-up stock.

Release fabrics are then stripped from the orthotic 21.

7. Finishing:

The finishing stage involves careful grinding of edge surfaces 70 of orthotic 21 to the desired accurate dimensions. Fine grit grinding and polishing help smooth rough spots on the edges of 70 and provide a better overall finished appearance. If requested, a post 71 can be placed on the orthotic 21 at the heel region. A cover can also be glued to the orthotic 21.

The resulting product is a hybrid composite orthotic 21 designed and constructed carefully from biaxially reinforced fabrics of Kevlar 49, graphite, and E-Glass fibers bonded together with thermosetting adhesive 28. The resulting product has the following features:

1. has a thin section of about 2.0 mm,
2. is engineered to ensure maximum resistance to both the longitudinal and transverse forces,
3. contains Kevlar 49 to provide additional resistance to repeated impact, fatigue, crack propagation, and better ability to dampen vibrations,
4. is a light-weight orthotic,
5. is carefully constructed with the reinforcing fibers of Kevlar 49, graphite, and E-Glass placed at different areas to take advantage of their respectively different properties, and provide a balance of strength, toughness, fatigue, and creep properties,
6. catastrophic failure is minimized, and
7. is manufactured with a simple technique involving inexpensive hand lay-up and forming procedure.

Having thus described the invention, what is claimed is:

1. A composite orthotic material of layers of woven fabric and biaxially reinforced fabrics, said material having a first and a second side and having a longitudinal and a transverse axis, one of said layers being on the first side and including a first type of fiber extending coaxially with both the longitudinal and transverse axes and another of said layers being on the second side and including a second type of fiber, extending coaxially with the longitudinal axis, and a third type of fiber extending coaxially with the transverse axis.

2. The material of claim 1 wherein said layers are bonded together with a thermosetting adhesive.

3. The material of claim 2 wherein said first type of fiber comprises Kevlar 49.

4. The material of claim 3 wherein said second type of fiber comprises either graphite or Kevlar.

5. The material of claim 4 wherein said third type of fiber comprises E-Glass.

6. The material of claim 1 wherein said first type of fiber comprises Kevlar 49.

7. The material of claim 6 wherein said second type of fiber comprises either graphite or Kevlar.

8. The material of claim 7 wherein said third type of fiber comprises E-Glass.

9. A composite orthotic material of layers of woven fabric and biaxially reinforced fabrics, said material having a first layer forming a first side thereof, a second layer forming a second side thereof, and a third layer between said first and second layers, said layers each having a longitudinal and a transverse axis, said first layer including a first type of fiber extending coaxially with both the longitudinal and transverse axes, said second and third layers each having a second type of fiber extending coaxially with the longitudinal axis, biaxially reinforced with a third type of fiber extending coaxially with the transverse axis.

10. The material of claim 9 wherein said layers are bonded together with a thermosetting adhesive.

11. The material of claim 10 wherein said second type of fiber of said second layer is adjacent said second side and said third type of fiber of said second layer is adjacent said third layer.

12. The material of claim 11 wherein said second type of fiber of said third layer is adjacent said second layer and said third type of fiber of said third layer is adjacent with first layer.

13. An orthotic device formed of a multi-layered composite material in the shape of a prescribed foot casting, said device to be used within an associated shoe and having a foot side and a shoe side, comprising:

a first layer forming said shoe side;
a second layer forming said foot side;
a third layer between said first and second layers;
said layers each having a longitudinal and a transverse axis;
said first layer including a first type of woven fiber extending coaxially with both the longitudinal and transverse axes;
said second and third layers each having a second type of fiber extending coaxially with the longitudinal axis biaxially reinforced with a third type of fiber extending coaxially with the transverse axis.

14. The device of claim 13 wherein the layers are bonded together with a thermosetting adhesive.

15. The device of claim 14 wherein said second type of fiber of said second layer is adjacent said foot side and said third type of fiber of said second layer is adjacent said third layer.

16. The material of claim 15 wherein said second type of fiber of said third layer is adjacent said second layer and said third type of fiber of said third layer is adjacent said first layer.

17. The material of claim 13 wherein said first type of fiber comprises Kevlar 49.

18. The material of claim 17 wherein said second type of fiber comprises either graphite or Kevlar.

19. The material of claim 18 wherein said third type of fiber comprises E-Glass

* * * * *